(12) United States Patent
Feinberg et al.

(10) Patent No.: US 12,095,960 B2
(45) Date of Patent: *Sep. 17, 2024

(54) SECURE MEDIA TRANSFER APPLIANCE

(71) Applicant: CHOL, Inc., Irvine, CA (US)

(72) Inventors: Michael R. Feinberg, Newport Beach, CA (US); Richard J. Blech, Irvine, CA (US)

(73) Assignee: CHOL, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/055,617

(22) Filed: Nov. 15, 2022

(65) Prior Publication Data

US 2023/0254427 A1 Aug. 10, 2023

Related U.S. Application Data

(63) Continuation of application No. 17/121,613, filed on Dec. 14, 2020, now Pat. No. 11,503,178, which is a continuation of application No. 16/129,702, filed on Sep. 12, 2018, now Pat. No. 10,868,937.

(51) Int. Cl.
  *G06F 12/00* (2006.01)
  *G06F 3/06* (2006.01)
  *H04N 1/21* (2006.01)

(52) U.S. Cl.
  CPC ......... *H04N 1/2158* (2013.01); *G06F 3/0605* (2013.01); *G06F 3/0623* (2013.01); *G06F 3/0643* (2013.01); *G06F 3/0652* (2013.01); *G06F 3/0673* (2013.01); *H04N 1/217* (2013.01)

(58) Field of Classification Search
  CPC .... H04N 1/2158; H04N 1/217; G06F 3/0643; G06F 3/0673; G06F 3/0623; G06F 3/0652; G06F 3/0605
  USPC ........................................................ 711/154
  See application file for complete search history.

(56) References Cited

U.S. PATENT DOCUMENTS

| | | | |
|---|---|---|---|
| 2010/0024041 A1 | 1/2010 | Yasaki et al. | |
| 2015/0278449 A1* | 10/2015 | LaBorde | G16H 40/20 705/3 |
| 2018/0007546 A1 | 1/2018 | Anderson et al. | |
| 2018/0165698 A1 | 6/2018 | Chandrashekar et al. | |
| 2018/0288087 A1 | 10/2018 | Hittel et al. | |

* cited by examiner

*Primary Examiner* — Mardochee Chery
(74) *Attorney, Agent, or Firm* — Knobbe, Martens, Olson & Bear, LLP (57) ABSTRACT

A data transfer device including an enclosure with a plurality of input/output connection ports, a processor, a memory including a data store, and a data transfer component. The data transfer component directs the processor to transfer data from an external data source via at least one of the plurality of input/output connection ports, encrypt the transferred data, store the encrypted data on the data store, responsive to a successful transfer of the encrypted data to the data store, delete the data from the external data source, establish a connection to an external data storage service, responsive to a successful connection to the external data storage service, transfer the encrypted stored data to the external data storage service, responsive to a successful transfer of the encrypted stored data to the external data storage service, deleting the encrypted stored data from the data store.

20 Claims, 7 Drawing Sheets

SECURE MEDIA TRANSFER APPLIANCE

CROSS-REFERENCE TO RELATED APPLICATIONS

This application is a continuation of U.S. patent application Ser. No. 17/121,613 filed Dec. 14, 2020, which is a continuation of U.S. patent application Ser. No. 16/129,702 filed Sep. 12, 2018, now U.S. Pat. No. 10,868,937 issued on Dec. 15, 2020, the entire contents of each of which are incorporated by reference herein and made part of this specification.

1. FIELD

Embodiments of the disclosure relate to the field of secure storage. More specifically, an embodiment of the disclosure is directed to a multi-interface application for secure transfer of content from a portable media source to a cloud network.

2. GENERAL BACKGROUND

Over the last few decades, electronic cameras have been used to record digital content, namely digital audio-video (AV) content, into its local storage. For some cameras, this "local storage" may include a hard disk drive (HDD) or certain types of removable memory card such as a portable solid-state drives (SSD) for example. Although the storage capacity of removable memory cards has increased over the last decade, the threat of loss or theft of these removable memory cards remains an overarching concern. Removable memory cards have an inherent resale value, but in most cases, the stored digital content has greater value than the memory cards themselves. In fact, the concern over lost digital content has prompted expansive use of public and private cloud-based services to maintain the recorded digital content.

Conventional cloud-based storage services may be configured to provide digital content hosting or digital content storage. For instance, certain types of digital content may be recorded for subsequent uploading to video sharing website (e.g., YouTube®) in an unencrypted format and freely downloadable by the public at large. However, other types of digital content may be highly sensitive, such as portions of a feature film or documentary where unauthorized posting of such digital content prior to release of the film or documentary could cost a movie studio millions or tens of millions of dollars. For sensitive digital content, encryption of such digital content is strongly encouraged prior to transmission to a cloud-based storage.

Normally, the transfer of digital content from the memory cards employed by electronic cameras (e.g., video movie cameras, camcorders, etc.) is performed by removal of the memory card as its storage level reaches capacity. For feature film and documentary production, which are created through the cumulation of dozens of video clips of short duration taken by different cameras at different geographic locations, multiple memory cards may be managed by a film crew at any one time. Without centralized management of the digital content, loss of the digital content by nefarious acts (e.g., theft of a memory card, intentional corruption or damage) or accidental oversights (e.g., loss of memory card, damage of the memory card during transit or by environmental conditions, accidental overwriting, etc.) is possible.

Currently, centralized management of the digital content may be accomplished by removing the memory cards from the electronic camera devices and communicatively coupling these memory cards to a networked device (e.g., a desktop computer, laptop, etc.), where the digital content from the memory card is downloaded and stored in an unencrypted format. Given the sensitivity of the digital content, it is undesirable to upload the digital content to a cloud storage service unless the digital content is encrypted. However, even if the networked device encrypts the digital content upon being uploaded to the cloud storage service for centralized retention, the memory cards (and perhaps the networked device) still retain the digital content in unencrypted (clear) format. The conventional storage procedures fail to provide a mechanism that ensures security of the digital content with relying on human activity in performing additional activities in protecting the security of the digital content, where human activity is prone to error.

Given the published accounts of security breaches of unsecured, sensitive digital content maintained in cloud networks and network-enabled computers, improvements in the management and protection of sensitive digital content is desperately needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Protecting information security is critical in today's information intensive society. In many different environments, sensitive digital content needs to be securely stored in a centralized location, such as a private cloud storage service or a public cloud storage service, for later retrieval. As described below, a secure media transfer appliance has been constructed for receipt of digital content from any of a plurality of input/output (I/O) interfaces and secure uploading and/or downloading of the digital content in an encrypted format with any type of key delivery scheme. Additionally, upon communicative coupling of a memory card to a prescribed I/O interface for that memory card, a connection to a cloud-based storage service can be made with subsequent uploading of the encrypted digital content.

It is contemplated that the methods, functionality and features described herein may be embodied in whole or in part as software or firmware (defined below), which operates on any computing device or on a distributed system deploying one or more computing devices. Alternatively, it is contemplated that the methods, functionality and features described herein may be embodied, in whole or in part, as hardware.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; an I/O controller (network, disk, memory, keyboard, etc.); an application specific integrated circuit; receiver, transmitter and/or transceiver circuitry; semiconductor memory; combinatorial logic, or combinations of one or more of the above components.

Logic (or a component) may be in the form of one or more software modules, such as executable code in the form of an operating system component, an executable application, firmware, an application programming interface (API), one or more subroutines, a function, a procedure, an applet, a plug-in, a servlet, a Component Object Model (COM) object, a routine, source code, object code, a shared library/dynamic linked library, a script, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the executable code is stored in persistent storage.

The term "media" refers generally to information or data that is used for communication. Examples of media include video, audio, pictures, animation, text, etc. which can also be combined in various ways to form multimedia. Specifically here, there is no limitation to the term "media" in relation to media data to be limited to strictly these formats. It is understood that any discussion of "media" files or data also includes other non-media file types and/or data.

A "computing device" generally refers to an electronic device with access to plaintext via a communication interface (e.g., a network interface controller, wireless transceiver, memory controller, a physical or logical port, etc.). Examples of a computing device may include, but are not limited or restricted to the following: a server; a router or other signal propagation networking equipment (e.g., a wireless or wired access point); a set-top box, a video-game console, an endpoint device (e.g., a stationary or portable computer including a desktop computer, laptop, electronic reader, netbook or tablet; a smart phone; etc.); or wearable technology (e.g., Apple® iWatch™, Fitbit® fitness wristband, etc.).

The term "interconnect" is a physical or logical communication path to or within a computing device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

A "block cipher" is deterministic logic that, for given a particular input, produces the same output. Different block ciphers may be used. For example, one type of cipher "Xotic," described in U.S. Pat. No. 8,744,078, the entire contents of which are incorporated by reference. For the description below, however, the Xotic cipher may be one of many different types of cryptographic ciphers utilized for secured communications between network devices. By way of example only, and not by way of limitation, the block ciphers may include AES, Serpent, Speck, Simon, ARIA, MARS, *Camellia*, and/or Twofish. In other words, the block ciphers may be part of a cipher suite, which includes a plurality of block ciphers available for use by the multi-stage data protection scheme. As an option, the cipher suite is stored to allow a user (or administrator) to select which of the block ciphers (all or some) are used by the multi-stage data protection scheme. This provides enhanced flexibility and security by allowing an administrator to update, substitute, add, remove or deactivate (i.e., prevent further use of) a block cipher from the cipher suite based on customer preferences, compromised ciphers, newly released (and more secure) ciphers, or the like.

Lastly, the terms "or" and "and/or" as used herein are to be interpreted as inclusive or meaning any one or any combination. Therefore, "A, B or C" or "A, B and/or C" may mean any of the following: "A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. System Architecture

Figure 1:
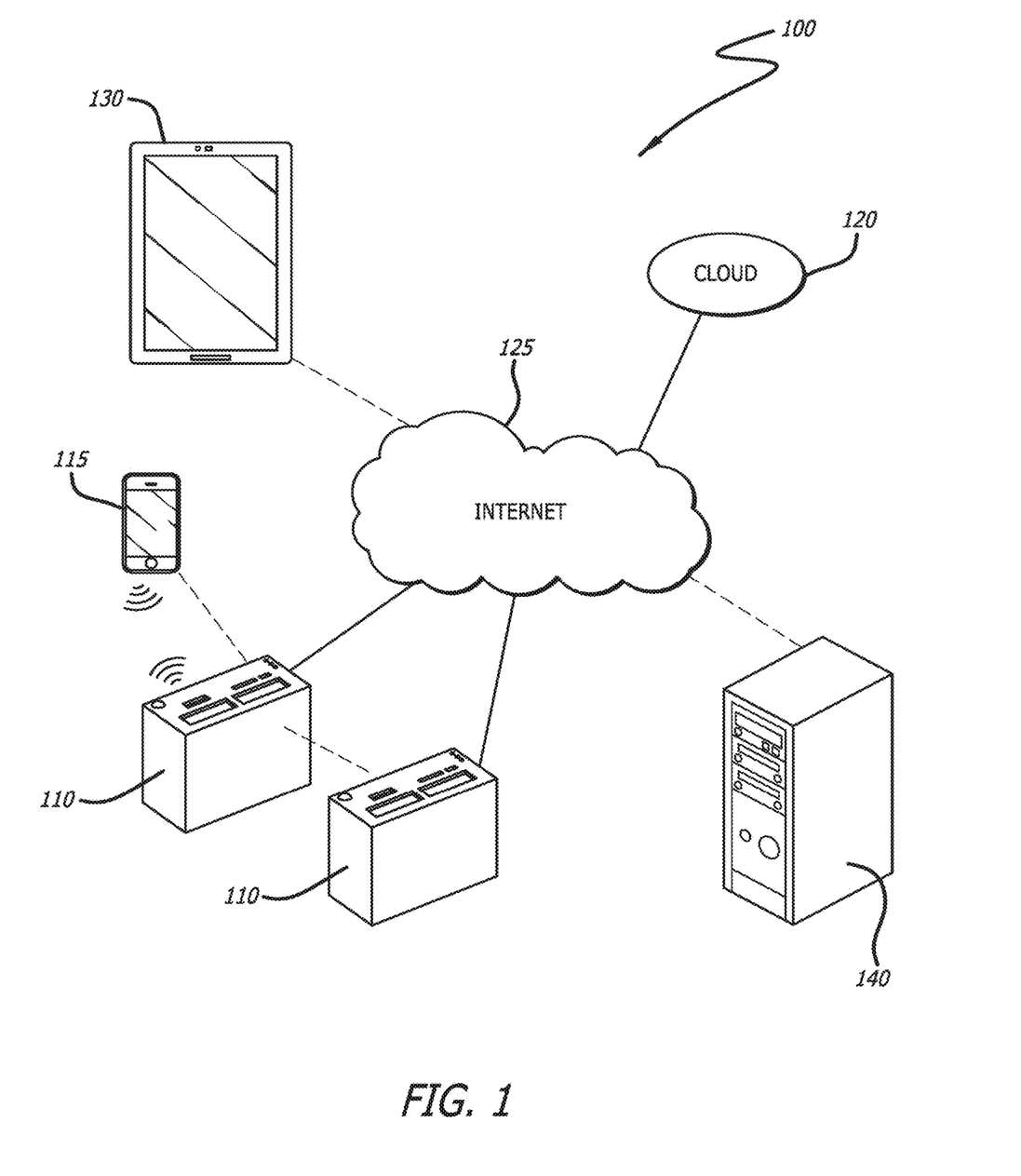
FIG. 1 is an exemplary embodiment of a digital content delivery system including a secure media transfer application communicatively coupled to a cloud network.

Referring to FIG. 1, a secure media transfer system 100 according to one embodiment of the invention is shown. Herein, the secure media transfer system 100 features at least one secure media transfer appliance 110 interconnected with a local mobile computing device 115 and/or an external network including the Internet 125. The secure media transfer system 100 can also include interconnects via the Internet 125 to devices including, but not limited to, a cloud-based storage system 120, remote mobile computing devices 130 and remote computing devices 140. As shown, according to this embodiment, multiple secure media transfer appliances 110 may be utilized within the system 100 and may be connected locally via a conventional interconnect method.

According to one embodiment of the disclosure, the secure media transfer device 110 is in communication with a local mobile computing device 115 that can be configured with an application that may direct the secure media transfer device 110 to operate based on the commands received from a user. The secure media transfer system 100 includes transferring media from external memory devices into the secure media transfer appliance 110 for secure backup to a variety of services. Upon selection by a user, once the media is successfully transferred from the external memory devices, the secure media transfer appliance 110 may delete all transferred media or otherwise render the external memory devices suitable for additional use. In many embodiments, once the media has been transferred to the secure media transfer appliance 110, the media is uploaded to a cloud-based storage service 120 via the Internet 125. Upon completion of a successful transfer of media to the cloud-based storage service 120, the secure media transfer appliance 110, upon setting by a user, may automatically delete the successfully transferred media stored within the secure media transfer appliance 110. In various embodiments, data may be downloaded from the cloud-based storage service 120 to the secure media transfer device 110.

In certain embodiments, the secure media transfer appliance 110 may utilize the local mobile computing device 115 for playback of stored media. Such playback features may be utilized to verify transferred data has not been corrupted or to review recorded footage obtained during a production process. By way of example and not limitation, a film production crew may utilize a cameras that record vast amount of data to removable hard disk drives, and upon filling the hard drives, the production crew may dump the recorded media into the secure media transfer appliance 110 and then view the playback of the transferred media on a tablet-based computing device before authorizing uploading to the cloud-based storage service 120 and/or deletion from the hard disk drive. In various embodiments, other computing devices such as, but not limited to, a remote mobile computing device 130 and/or a remote computing device 140 can also access the stored media either from a remote network connection to the secure media transfer appliance 110 or from the cloud-based storage service 120 once the media has been uploaded and stored there.

In a number of embodiments, the media transferred from external memory devices can be encrypted on the fly as it is transferred into the secure media transfer appliance 110 or post-transfer within the internal storage of the appliance 110. The encryption of data at this stage in the secure media transfer system 100 allows the media to be transferred and stored at all other points in the system 100 securely. For many users, security is a necessary consideration of their data management system. A secure media transfer system 100 can provide users with a method of storing and transferring media only to authorized users and keeping unauthorized users from accessing the media via an almost entirely encrypted storage and transport system. By way of example and not limitation, a first user may encrypt and load media into a secure media transfer appliance 110 and then send a second user at a remote mobile computing device 130 an authorization key that would allow the second user to access, decrypt and playback media transferred from the secure media transfer appliance 110 to the cloud-based storage system 120.

III. Secure Media Transfer Appliance Architecture

Figure 2:
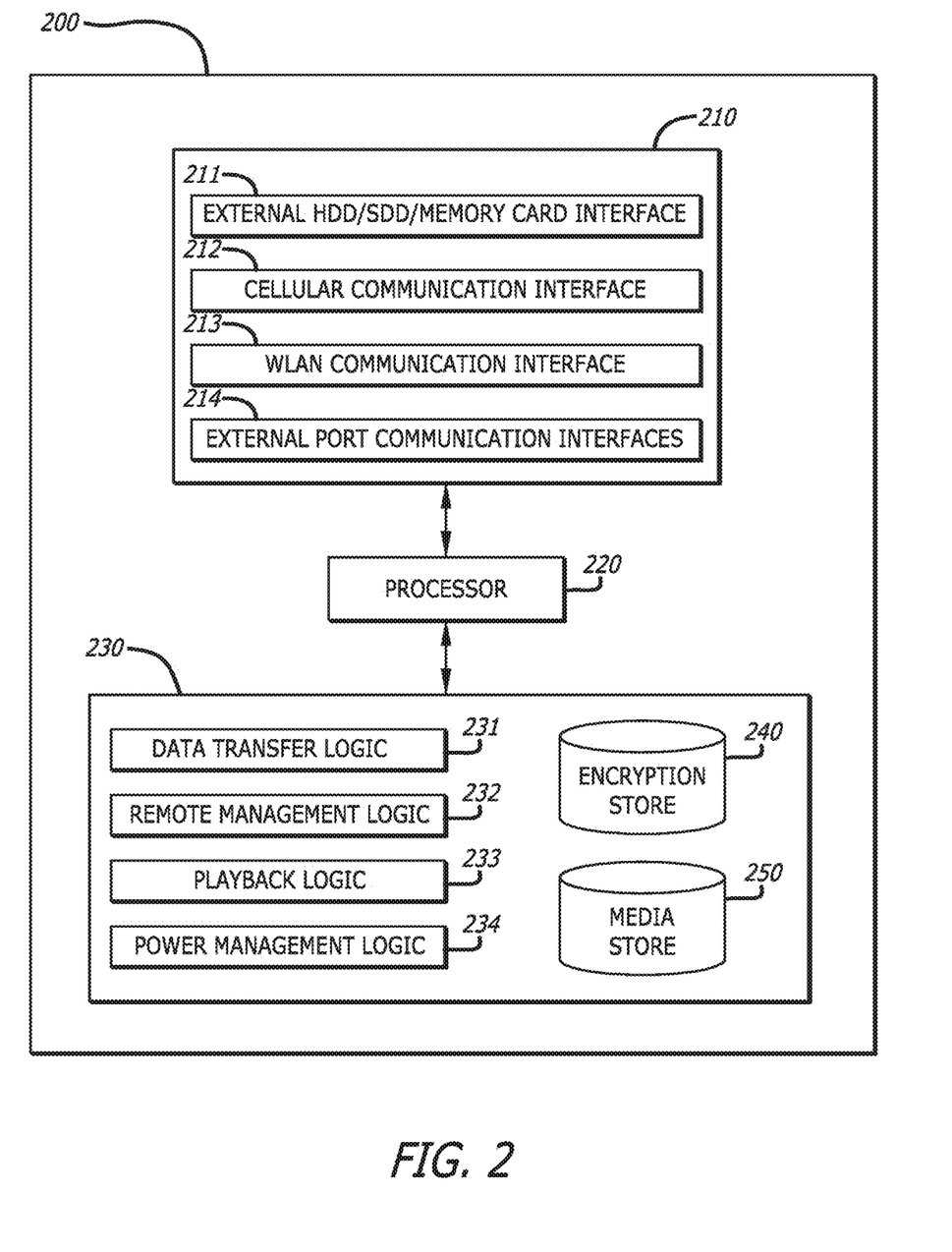
FIG. 2 is an exemplary embodiment of a block architecture of the secure media transfer appliance of FIG. 1.

Referring to FIG. 2, a block diagram of one embodiment of a secure media transfer appliance 110 of FIG. 1 is shown. Herein, the appliance architecture 200 features a communication interface 210, processor 220 and an internal memory 230 (e.g., volatile storage and/or non-volatile storage). As shown, according to this embodiment, the data transfer logic 231, remote management logic 232, playback logic 233, and power management logic 234 is stored within the internal memory 230 along with the encryption store 240 and data store 250. In the embodiment depicted in FIG. 2, the communication interface 210 includes an external memory device interface 211, cellular communication interface 212, wireless local area network (WLAN) interface 213, and external port communication interface 214.

The processor 220 is a multi-purpose, programmable component that accepts digital data as input, processes the input data according to stored instructions, and provides results as output, as described above. In certain embodiments, the processor may be an Advanced RISC Machine (ARM) processor from Arm Holdings in Cambridge, England, United Kingdom. Utilizing ARM processors can provide for sufficient processing power necessary to facilitate sufficient encryption, data transfer, and playback processing while allowing for reduced power draw compared to other processors. In many embodiments, the data store can be provided as an array of multiple hard drives with built-in data redundancy. By way of example and not limitation, the data store can be an array of two matching (size, model, and/or manufacturer) hard disks that are installed and set up with Redundant Array of Independent Disks (RAID) level 5 scheme. In certain embodiments, the RAID level and/or presence of a disk redundancy scheme may be user selectable.

In additional embodiments, the media store 250 may be located on a separate internal memory structure. In further embodiments, the data transfer logic 231, remote management logic 232, playback logic 233, and power management logic 234 can be located on an embedded memory system in cooperation with the processor 230. The logic contained within the internal memory 230 may be flashed/updated as needed from processes including, but not limited to, an upgrade patch received from an external port communication interface 214 (such as a Universal Serial Bus (USB)) or through data received from an external computing device through either the cellular communication interface 212 and/or the WLAN communication interface 213.

The communication interface 210 can have a large variety of interconnects based upon the needs of the user and the needs of the specific application. One skilled in the art can realize that the types of interconnects utilized is only limited by the types of interconnects currently available on the market. Further, the secure media transfer applicant architecture 200 can be modified to allow for the addition or interchangeability of various interconnects to facilitate the inclusion of new interconnect types as they become available. By way of example and not limitation, the cellular communication interface 212 may be installed such that it is removable and interchangeable with a different cellular communication interface that utilizes an upgraded cellular interface speed, or utilizes differing cellular communication schemes based on local cellular networks. Other aspects of the communication interface 210 may be user-upgradable to allow for greater flexibility in use.

In most embodiments, security measures are applied to all files that are transferred into the secure media transfer appliance including encrypting the data to be stored. Such security measures and encryption algorithms can be stored within the data transfer logic and utilize a specialized encryption store 240 for the storage of any data necessary for security. By way of example and not limitation, the encryption store 240 may contain specialized encryption methods including block ciphers that can be utilized to encrypt data transferred into the system. In other embodiments, the secure media transfer appliance architecture 200 includes an encryption logic separate from the data transfer logic. In certain embodiments, the encryption store 240 can be in a separate memory structure from memory 230. In further embodiments, the encryption store 240 comprises data necessary to decrypt the data stored in the media store 250. In further additional embodiments, the encryption store can be contained within an external memory device that must be interconnected to the secure media transfer appliance through an external port communication interface 214 in order for decryption or other operations to occur. In a variety of embodiments, the user may choose from a variety of cipher suites to facilitate the encryption of data transferred between the secure media transfer appliance and other devices or cloud-based storage services.

Those skilled in the art will realize that features of the secure media transfer appliance architecture 200 can be changed or otherwise modified based on the needs of a user for a given application. For example, a larger processor may be utilized based on the computational demands required by the user. The hard drive arrangement can greatly vary including a change in the size of the hard drives utilized in response to a need for more storage, or the type of disk redundancy in response to the volatility of the environment.

IV. Secure Media Transfer Appliance Architecture

Figure 3:
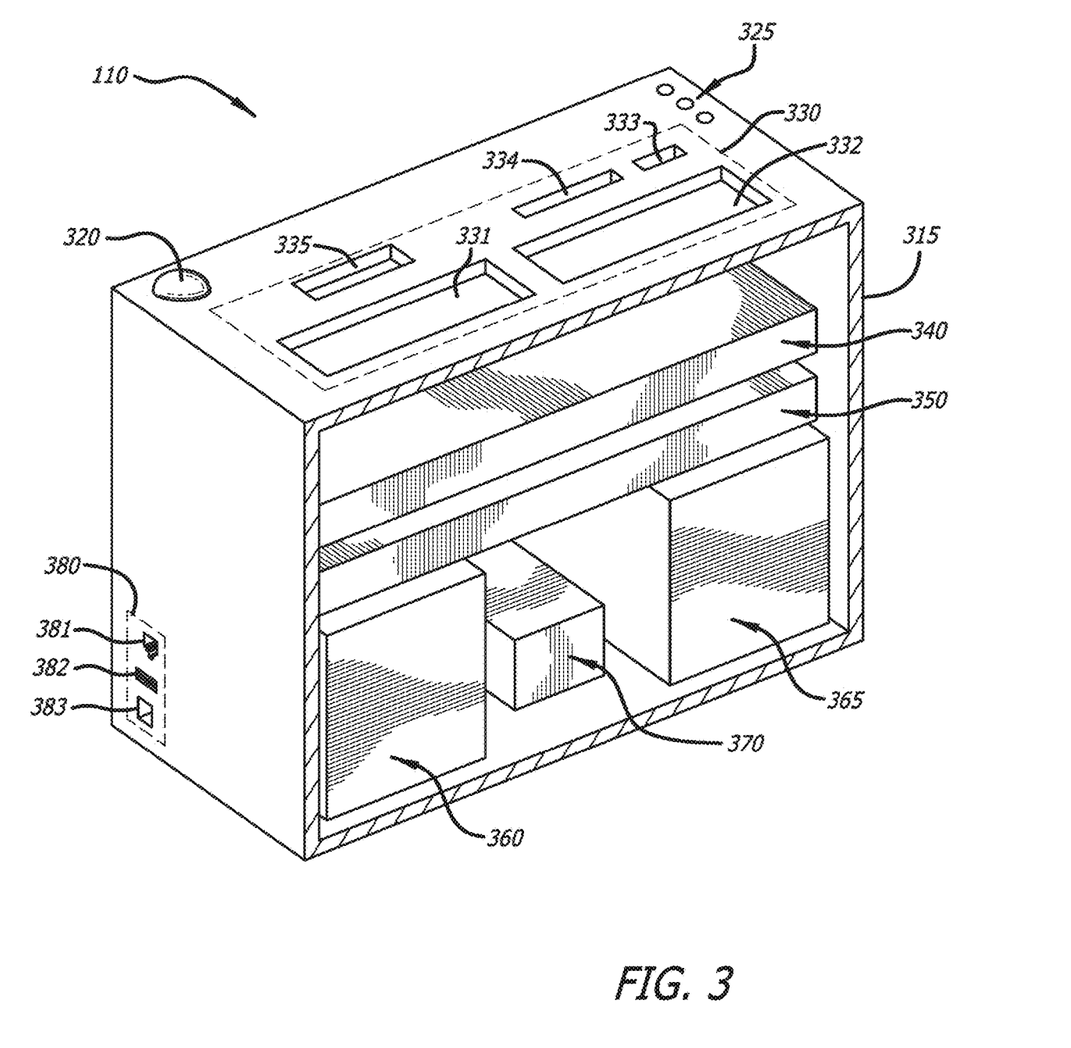
FIG. 3 is a first exemplary embodiment of a physical architecture of the secure media transfer appliance of FIG. 1.

Referring to FIG. 3, one embodiment of a secure media transfer appliance 110 of FIG. 1 is shown. Herein, the appliance 110 is housed within an enclosure 315 that includes a power button 320 and light emitting diode (LED) indicators 325. As shown, according to this embodiment, an external memory device interface area 330 includes a first hard disk drive slot 331, a second hard disk drive slot 332, a secure digital (SD) card slot 333, a compact flash (CF) card slot 334, and a Personal Computer Memory Card International Association (PCMCIA) card slot 335. The pictured embodiment of FIG. 3 has an external port area 380 including an Ethernet Category 5/6 (CAT 5/6) port 381, a Universal Serial Bus (USB) 3 port 382, and an IEEE 1394a/b/c "Firewire" port 383. The secure media transfer appliance 110, according to this embodiment, contains a computer 340 with memory card interface, an input/output interface system 350, two hard disk drives 360, 365, and a power source 370.

In many embodiments, the enclosure 315 of the secure media transfer appliance 110 is composed of a durable material suitable for heavy use. The appliance 110 is contemplated to be used outside in the field for data transfer processes. The enclosure 315 can be conditioned with materials in order to reduce electrical/electrostatic discharges. Additionally, the enclosure 315 may be designed in a manner that reduces the potential for outside contaminants such as, but not limited to, water and/or dust from entering into the internal area of the enclosure 315. By way of example and not limitation, the external memory card slots may be designed with spring-loaded retractable covers that seal the memory card slots 331, 332, 333, 334, 335 closed when not in use. Furthermore, the power button 320 may be designed without moving parts and/or include a capacitive button relay. In some embodiments, the LED indicators 325 are recessed and covered by a protective film or cover within the enclosure 315. In other embodiments, the LED indicators 325 may be built within the power button 320 or eliminated by utilizing a multi-color LED within the power button 320 to convey equivalent information to the user.

In various embodiments, at least one side of the secure media transfer appliance 110 contains an external memory device interface area 330. The interface area 330 is generally designed to facilitate the transfer of data between the external hard drive inserted within a slot and the internal hard drives 360, 365 of the appliance 110. Data transfer can be accomplished by inserted an external memory device into a respective slot. As shown, the hard disk drive slots allow for a direct interface between the computer 340 and at least one hard disk drive. However, in certain embodiments, the interface between the external memory device and the secure media transfer appliance 110 may occur on a separate or specialized break-out board. It can be understood by someone skilled in the art, that the exact amount and layout of external memory device interfaces can be changed depending on the specific application needed. For example, professional users may utilize CF cards more than other users and thus need this option, while consumer level users may not use CF cards, but have a desire for a micro SD card slot to transfer data from their phone or other devices.

In further embodiments, an external memory interface slot may be designed with the ability to offer a customized insert that will add a new memory device slot that was not available prior. In this way, the secure media transfer appliance 110 may be modified to allow for the use of future format factors or for specialized, proprietary formats that are not in general use. In these embodiments, such universal slot spaces may interface with the computer 340 via a standardized or interchangeable interconnect or cable/bus. By way of example and not limitation, a customizable external memory interface may allow for the interfacing of a disc-based reader such as a Blu-Ray (BD) disc, digital video disc (DVD), and/or a compact disc read only memory (CD-ROM). Such an interface may allow for the automatic archival of personal media.

In various embodiments, at least one side of the secure media transfer appliance 110 comprises an external port interface area 380. The ports within the external port interface area 380 are typically utilized for transferring data from external devices that do not have accessible and/or removable memory cards that can be inserted into the external memory device interface area 330. In additional embodiments, the external ports may also be utilized to transfer data out of the secure media transfer appliance 110 including mirroring the contents of the hard disk drives 360, 365 to another secure media transfer appliance 110. In further embodiments, the external ports may be utilized to expand the internal storage of the secure media transfer appliance 110 by utilizing external storage drives connected to an external port. In still additional embodiments, the external ports may be utilized to output data necessary to playback media on a local device at high resolution/data rates that may not be possible over a wireless local connection. In various embodiments, the location of the ports may be decentralized in order to reduce production costs or to account for limited interface placement within the computer 340 or input/output interface system 350 after miniaturization and/or redesigns occur.

The secure media transfer appliance 110 is operated by a computer system 340. As shown in the depicted embodiment, the computer 340 may be separate from the input/output system 350 and the external hard drives 360, 365. It is contemplated that further revisions that value space minimization may integrate components together into a single circuit board system including, but not limited to, the computer 340, the input/output interface system 350, and/or the hard drives 360, 365. In various embodiments, the input/output system 350 includes a general purpose input/output (GPIO) for interfacing with the hard drives 360, 365 and computer 340, a cellular connection component, global positioning system (GPS) component, Wi-Fi® component, and/or wired external interface components. It should be understood by those in the art that certain components may be integrated such as the cellular connection, GPS, and Wi-Fi® connection into a single embedded system. In additional embodiments, the cellular connection is a "fifth generation" (5G) connection.

The secure media transfer appliance 110 comprises at least one hard drive for storage of data. As shown, the embodiment depicted in FIG. 3 shows two hard drives 360, 365 within the enclosure 315. By way of example and not limitation, the pictured embodiment can be deployed with two separate low-voltage 8 terabyte (TB) hard drives that are set up in a RAID level 5 array to prevent data corruption by a single drive.

The power supply 370 can not only regulate and provide power to the various components of the secure media transfer appliance 110, but it can also be configured with an internal battery to provide power to the appliance 110 when not directly connected to an external power source. In further embodiments, the internal battery of the power source 370 can be removed and/or exchanged by the user depending on the application needed. For example, a user who is planning to record large amounts of content out in the field may want to switch out and allow for a bigger battery with more run time whereas a user who is using the secure media transfer appliance 110 strictly in a home setting with no desire to take it out in the field may choose to remove the battery portion of the power source 370 in order to save weight. Furthermore, in certain embodiments, the internal power source 370 may have a conventional plug design for attaching the secure media transfer appliance 110 to a standard electrical source including a 110 Volt or 220 Volt wall outlet. In other embodiments, the power source 320 may be able to provide power for operation through a connection to another device through a USB-C connection which may also allow for the charging of the internal battery.

Figure 4A:
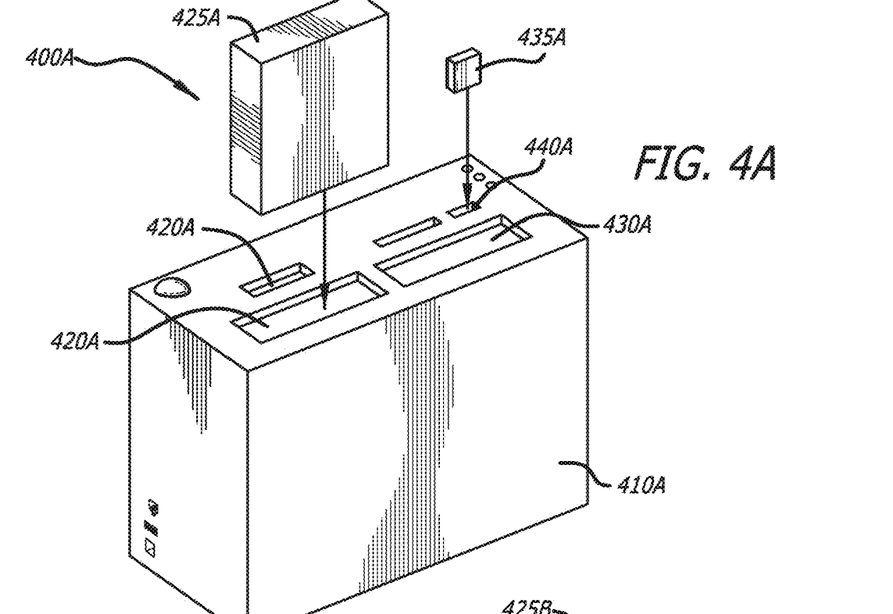
FIG. 4A is a first exemplary embodiment of the secure media transfer appliance of FIG. 3.

Referring to FIG. 4A, in accordance with one embodiment a set-top media transfer system 400A is shown. The system 400A includes a set-top secure media transfer appliance 410A that is similar to the secure transfer media appliance 110 as depicted in FIGS. 1 & 3. The depicted set-top secure media transfer appliance 410A includes a variety of external memory device slots including hard disk drive slots 420A, memory card slots 430A, and a PCMCIA slot 440A.

In many embodiments, the user may provide a hard disk drive 425A or other memory card 435A in order to facilitate a data transfer to the set-top secure media transfer device 410A and/or a remote cloud-based storage service. The external memory device slots 420A, 430A, 440A are designed to be coupled with a respective external memory device. For example, a user may insert a hard disk drive 425A directly into the hard disk drive slot 420A of the set-top secure media transfer appliance 410A.

In certain embodiments, the insertion of the hard disk drive and/or memory card will be manually accomplished with an interconnect between the memory device and the receiving interface which can provide an audible clicking noise to signal to the user that the insertion has been successful. In further embodiments, the removal of the hard disk drive and/or memory card may be through a manual retraction of the external memory device from the receiving interface. In other embodiments, the removal of the external memory device may be accomplished via the pressing of an eject button or via a "push-eject" system typically found in memory card interfaces.

Although many embodiments utilize the secure media transfer appliance 410A to transfer data from an external memory device to an internal memory which is then uploaded to a cloud-based storage system, certain embodiments can utilize a reverse process. In these embodiments, the secure media transfer appliance 410A is utilized to download data from the cloud-based storage system to the internal storage which can then transfer the downloaded data to an external memory device. By way of example, not limitation, major motion pictures often use digital projectors that take at least one hard disk drive as an input with the movie being provided in the form of a digital file. The movie theaters that use such projectors often have the movies delivered through physical mail services on a series of hard drives or are downloaded from an online source. Because of the risk of piracy, all such digital movie transfers must be secure. The secure media transfer appliance 410A may provide such a secure transmission channel by accessing a secure cloud-based storage system and downloading an encrypted file to its internal memory. The downloaded files may then be transferred to an external memory device such as a hard disk drive 425A. In additional embodiments, the hard disk drive 425A may be left within the secure media transfer appliance 410A in order to facilitate live updates from content producers as needed which are then notified as being available to the user through various notification means as described further below.

Figure 4B:
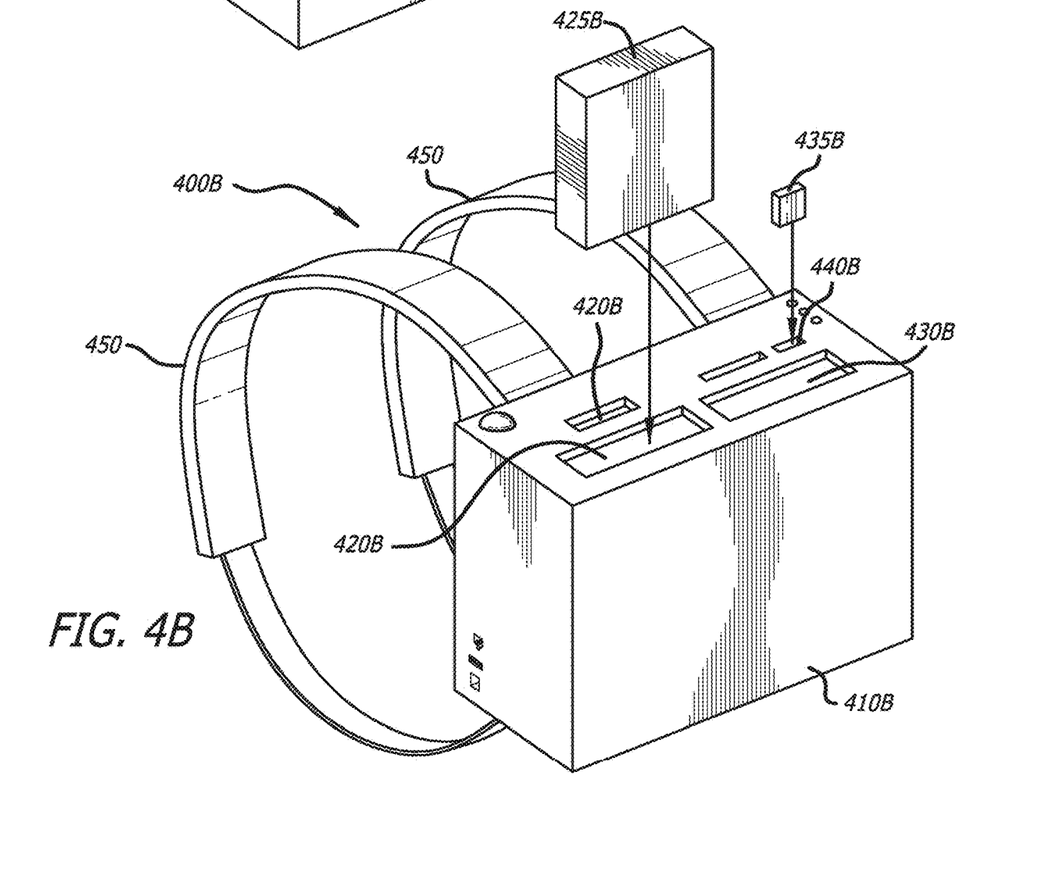
FIG. 4B is a second exemplary embodiment of the secure media transfer appliance of FIG. 3.

Referring now to FIG. 4B, a second embodiment of the secure media transfer appliance 410B is shown as a mobile secure media transfer system 400B. Similar to the set-top secure media transfer appliance 410A shown in FIG. 4A, the mobile secure media transfer appliance 410B comprises a series of external memory device slots including hard disk drive slots 420B, memory card slots 430B, and PCMCIA slots 440B.

In a number of embodiments, the mobile secure media transfer appliance 410B can be designed to be worn including, but not limited to, the backpack configuration shown in FIG. 4B.

In additional embodiments, the mobile secure media transfer appliance 410B can be configured with a larger internal battery to allow for increased use away from an external power source.

Figure 5:
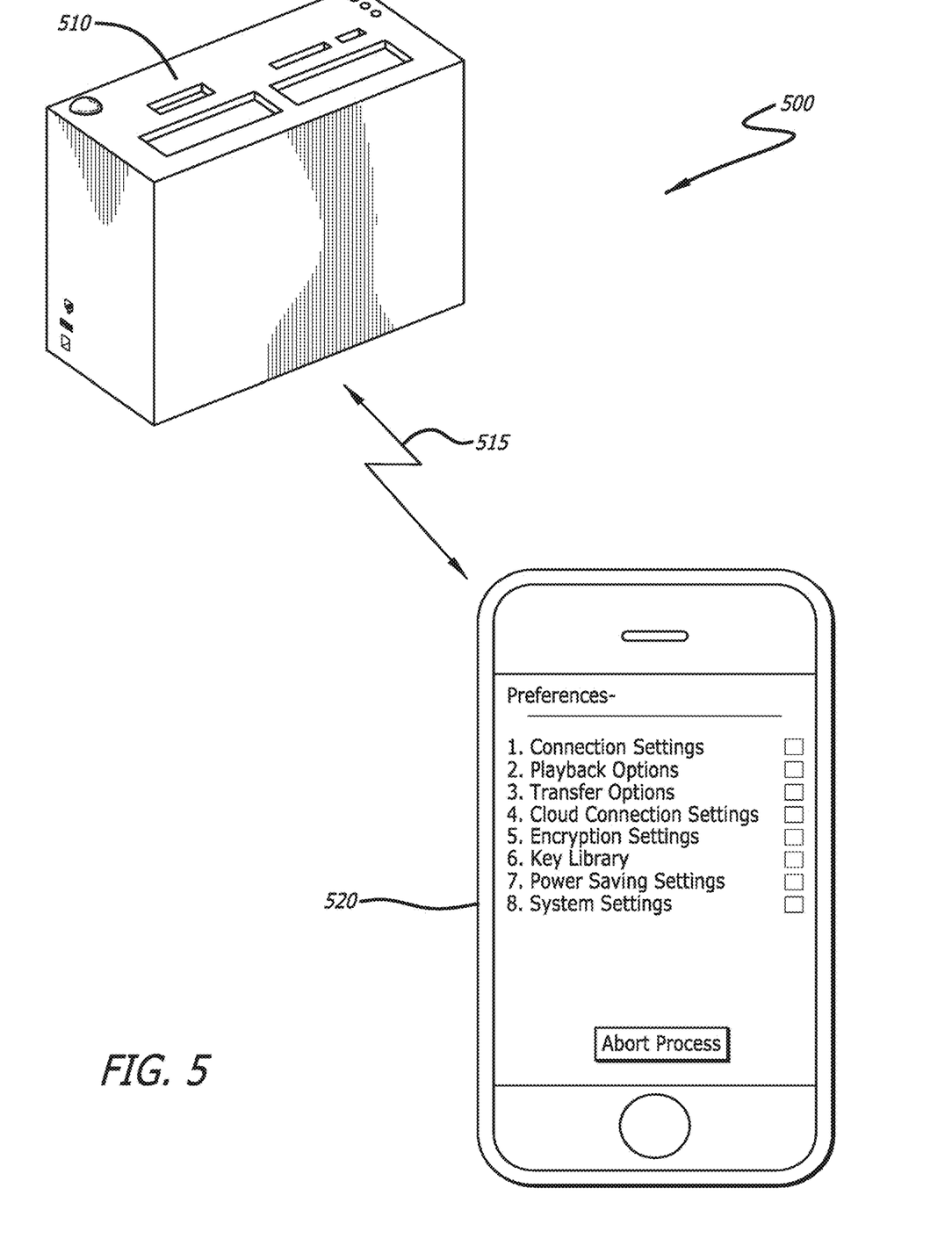
FIG. 5 is an exemplary embodiment of the communication scheme between a portable computing device with display and the secure media transfer appliance for setting programmable operability of the secure media transfer appliance.

Referring to FIG. 5, one embodiment of a secure media transfer appliance 510 in communication via a wireless connection 515 with a mobile computing device 520 is shown as a local secure media transfer system 500. In many embodiments, the secure media transfer appliance 510 is similar to the secure media transfer appliance 110 depicted in FIGS. 1-3 and the mobile computer device 520 is similar to the mobile computing device 115 depicted in FIG. 1.

The system 500 allows for a direct connection between the user and the secure media transfer appliance 510, even when the user is not directly within physical proximity of the appliance 510. Additionally, the local secure media transfer system 500 can provide a means for accessing settings and other abilities of the secure media transfer appliance 510 allowing for the reduction of costly and/or nondurable components on the appliance 510 itself. For example, accessing the secure media transfer appliance 510 through an application on a smart device may eliminate the need for a user screen and/or selection buttons on the appliance 510 since all of the functions are accessible through the application running on the mobile computer device 520.

The wireless connection 515 between the secure media transfer appliance 510 and the mobile computing device 520 may be initiated via a pairing option. In various embodiments, the initial pairing may be accomplished through a Bluetooth® connection or via the creation of an initial ad-hoc local wireless network. In certain embodiments, when the secure media transfer appliance 510 is powered on or wakes from a lower-power consumption mode, the appliance 510 may activate its available wireless connection signals to look for a previously-established authorized mobile computing device 520. When no authorized mobile computer device can be found 520, the secure media transfer appliance 510 may initiate the transmission of a setup signal by, for example, activate a pairing mode that can be in the form of a Bluetooth® pairing signal or creating an ad-hoc wireless network signal.

In response to the successful pairing or connection to the setup signal, the mobile computer device 520 may be configured to have an application designed specifically for communication with the secure media transfer appliance 510 installed and be responsive to the setup signal. In various embodiments, when a properly configured mobile computing device 520 connects with a setup signal, a log-in screen may be presented to a user to prompt the input of log-in credentials of a previously authorized user. In this way, access to the settings of the secure media transfer device 510 can be limited to authorized users only. In further embodiments the log-in credentials of previously authorized users may be stored either in a cloud-based storage system or locally within the memory of the secure media transfer appliance 510. In certain embodiments, the previously authorized user credentials are stored in the cloud-based storage system and are only verified via the application on the mobile computer device 520 by connecting to the cloud-based storage system for verification. In other embodiments, when access to the cloud-based storage system is limited or unavailable, previously authorized user log-in credentials can be verified against data stored in the secure media transfer appliance 510. In additional embodiments, when no users have been previously authorized, or when the appliance 510 has been factory reset, the secure media transfer appliance 510 may allow for any connection to establish an initial administrative account that can limit further access based on the desired needs of the application.

In a number of embodiments, the mobile computing device 520 may include a variety of preferences available to the user, as depicted in FIG. 5. These preference may include, but are not limited to, connection settings, playback options, transfer options, power saving options, cloud connection settings, encryption settings, key library, and an abort process selection. Those skilled in the art will understand that any depicted functions within an application for a mobile computing device 520 can be updated and/or changed based on the needs of the users or because of changes in the features/functions of the mobile computing device 510. For example, a set of new features may be added for the user to select, or certain current menus may be merged or nested to allow for changes to the graphical user interface.

In one embodiment, a connection settings preference is available to facilitate local connections between the secure media transfer appliance 510 and other local devices including setting the level of security required. In certain embodiments, the user may need to authorize any external memory devices that are interconnected to the appliance 510 before transfer. Conversely, a user may also need to authorize any downloading or transfer of data out of the appliance 510. In another embodiment, the connection settings may facilitate connection between the secure media transfer appliance 510 and other secure media transfer appliance units which can have settings mirrored to them and/or act otherwise in a master/slave relationship to the unit directly connected to by the authorized user, allowing for either multiple input multiple output (MIMO) type arrangements to transfer data from a single appliance to the cloud through multiple network/cellular connections of the multiple units, or to utilize the storage space of additional slave units from data transfers initiated by the master unit.

In one embodiment, playback options may be presented that can allow a user to set the parameters regarding playback of media files on the secure media transfer appliance 510. Settings regarding playback are discussed in more detail below, but can include, but are not limited to, playback quality, playback speed, playback effects/processing, and/or playback methods utilized.

In one embodiment, transfer options may be presented that can allow a user to select the data management settings they require for their application. By way of example and not limitation, a user may utilize the transfer settings to select if inserted external memory devices are automatically downloaded to the local storage, what encryption methods to use, if the transferred data should automatically be uploaded to a cloud-based storage system, and/or if the external memory devices should be erased once the transfer into the secure media transfer appliance 510 is complete.

In one embodiment, the user may be presented on the preference screen with a cloud connection settings option which may allow the user to select which cloud-based storage systems to transfer the stored files to. The user can be prompted for log-in credentials and potentially store these credentials within the application of the mobile computer device 520. Additionally, the user may set connection settings that authorize uploading of data to the cloud-based storage system at specific times, e.g. when the secure media transfer appliance 510 is not transferring new files in from external memory devices, or connecting only when there is a strong enough signal above a pre-determined threshold.

In one embodiment, an encryption settings option may be presented to the user which can facilitate selection of various security settings desired by the user. In additional embodiments, the user may select a specific cipher suite to use for connecting to other network devices. Encryption settings may also allow users to determine how securely the secure media transfer device 510 should be including the limiting of access to decrypting data to when an external memory device with sufficient credential data and/or decryption data is inserted into the appliance 510. In another embodiment, the user may also have a key library option that can help the authorized user distribute and/or restrict keys that can be used to decrypt that data. By way of example and not limitation, an authorized user may be encrypted data that has been transferred into the secure media transfer appliance 510 that is required to be viewed by another individual remotely. The authorized user may send a decryption key to the other individual that allows them to decrypt and view the data either directly from the secure media transfer appliance 510 or from the cloud-based storage system. In many embodiments, the key library preferences allow an authorized user to distribute, revoke, and set time-limits on keys distributed to other individuals.

In many embodiments, power saving settings are present for an authorized user to set. In certain use cases, the secure media transfer appliance 510 may be utilized without an external power source and may be relying solely on internal battery power or via power provided from an external connection port such as a USB-C connection. In these cases, minimizing the amount of power used is desired. In certain embodiments, the user may have preferences for when to transfer files based on the power levels available. By way of example and not limitation, the secure media transfer appliance 510 may be restricted to only transferring data to a cloud-based storage system when power levels are at least fifty percent, or when it is receiving power from an external power source, or when it is connected to a non-cellular network connection. In another example, during travel, the cellular connection to a cloud-based storage system may be lost, and the secure media transfer applicant 510 may enter a lower power consumption mode of operation in response. Additionally, power saving could be accomplished by entering into a lower power consumption mode of operation when not in use and then entering a normal mode of operation in response to a received "wake up" signal when an external memory device is inserted into the appliance 510. A "wake up" signal could be generated in response to the insertion either by a physical relay within the interconnect mechanism or by logic within the system.

In various embodiments, a system settings option can be present to allow an authorized user to change system-wide settings. For example, a factory reset option could be present as well as a "reboot" option to shut down and restart the secure media transfer appliance 510. System settings that may also be present include, but are not limited to, internal/external disk formatting, internal/external disk file system type, system health/monitor (including internal appliance 510 temperature, CPU usage, memory usage, etc.), internal/external disk space used/remaining, and/or cellular information.

In one embodiment, the user may wish to terminate the current process or may wish to send an interrupt signal to the secure media transfer appliance 510 when it is being non-responsive. In these instances, an "abort process" button may be necessary to cease hang-ups in the system or to terminate a transfer in progress.

Figure 6A:
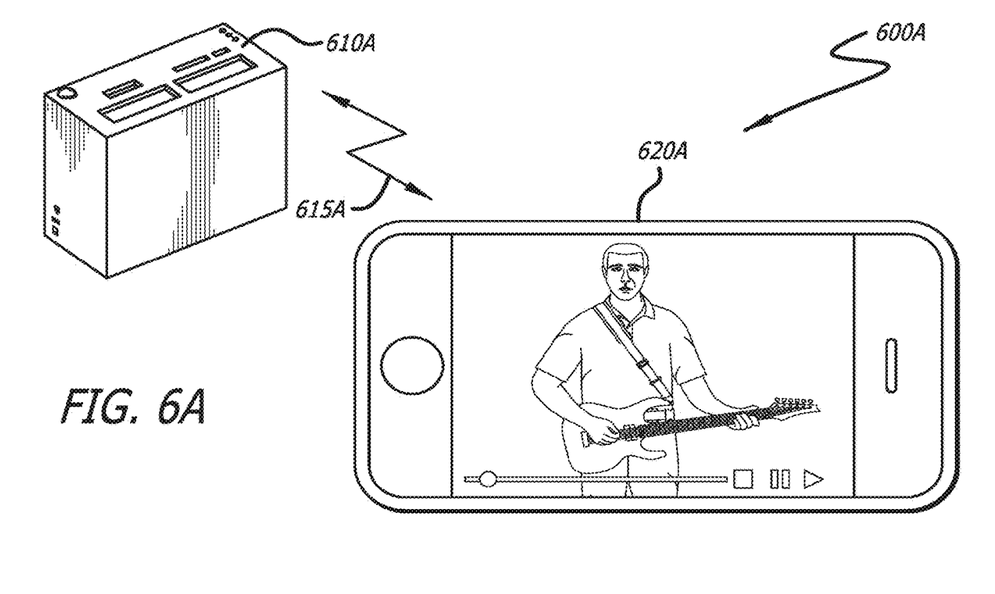
FIG. 6A is an exemplary embodiment of a first setting of the secure media transfer appliance supporting playback of the digital content from an inserted memory card.

Referring to FIG. 6A, one embodiment of a secure media transfer appliance 610A in communication via a wireless connection 615A with a mobile computing device 620A is shown as a local secure media transfer system for playback 600A. In many embodiments, the secure media transfer appliance 610A is similar to the secure media transfer appliance 110 depicted in FIGS. 1-3 and the mobile computer device 620A is similar to the mobile computing device 115 depicted in FIG. 1.

In many embodiments, one of the features of the secure media transfer appliance 610A is the ability to playback media files stored on the appliance 610A directly on the application hosted on the mobile computing device 620A via the wireless connection 615A. This can allow for the review and verification of media data before it is deleted or transferred to the cloud-based storage service. In certain embodiments, the playback within the mobile computing device 620A can be accomplished through the use of a built-in system media playback application. In other embodiments, the application on the mobile computer device 620A is paired with the secure media transfer appliance 610A such that the application may receive the media file for playback in an encrypted format and subsequently decrypt the media file for playback within a specialized, secure playback component within the application.

In still other embodiments, the secure media transfer appliance 610A may be able to serve the media file to multiple parties for review by generating an open ad-hoc wireless connection signal that may be connected to by anyone with a compatible mobile computing device. In further embodiments, the serving of the media playback content can be provided to additional users without the application configured to pair with the secure media transfer appliance 610A by generating an hyper-text markup language 5 (HTML 5) page with a generic or standardized media container that may be viewable in a standard web browser. In still further embodiments, access to the HTML page may still be restricted through the use of a standard username and password prompt that can be administered and/or distributed by an authorized user.

Further embodiments may include a method for post-processing of the video during playback. For example, the processor of the secure media transfer appliance 610A may provide enough computational ability to allow for effects to be added to a livestream of the video. In other embodiments, the application on a mobile computer device 620A may post-process the video signal during playback. In certain use cases, the user may want to view playback of a processed signal that may match various attributes in order to verify that the captured media is satisfactory before deletion or transfer to the cloud-based storage service. By way of example and not limitation, a movie producer may want to add effects such as color grading and/or slow motion to verify a captured shot is acceptable. In one embodiment, the post-processing scripts and/or algorithms are integrated into the system via a standardized plug-in format such as Adobe After-Effects, Virtual Studio Technology (VST), or AudioUnits (AU).

Although the embodiment depicted in FIG. 6A depicts a local secure media transfer system for playback 600A, it should be understood that other embodiments are capable to provide for playback from the secure media transfer device to remote computing devices as well. Additionally, those skilled in the art will recognize that a local playback system may exclude the wireless connection signal 615A in favor of a direct connection between the playback screen and the external communication ports of the secure media transfer appliance 610A in order to allow for an increased bandwidth and reduced lag time.

Figure 6B:
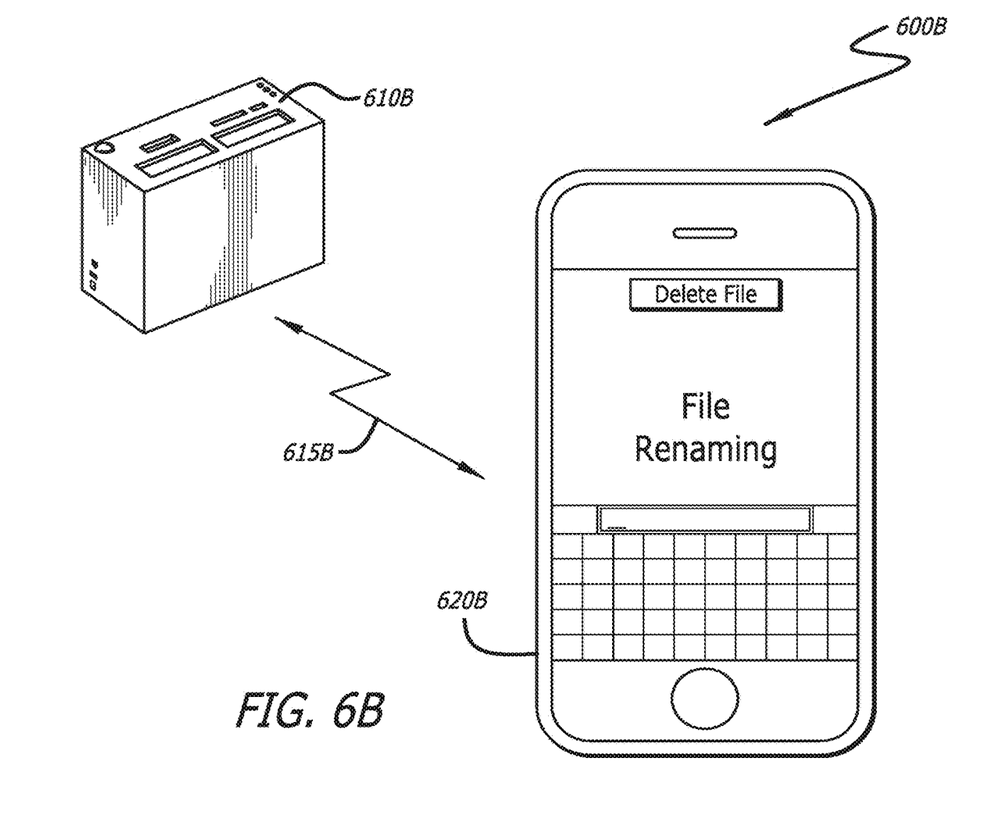
FIG. 6B is an exemplary embodiment of a second setting of the secure media transfer appliance supporting automated renaming and deletion of the digital content from an inserted memory card.

Referring to FIG. 6B, an embodiment of a secure media transfer appliance 610B in communication via a wireless connection 615B with a mobile computing device 620B is shown as a local secure media transfer system for file management 600B. In many embodiments, the secure media transfer appliance 610B is similar to the secure media transfer appliance 110 depicted in FIGS. 1-3 and the mobile computer device 620B is similar to the mobile computing device 115 depicted in FIG. 1.

In many use cases, users may have a need to rename the files that are being transferred from external memory sources. By way of example and not limitation, a video producer may have a full hard drive that contains media files corresponding to a certain scene or angle in the video production and utilize the secure media transfer appliance 610B to free up space on his hard drive. In this situation, the producer may desire to batch rename all of the files being transferred to label them according to the corresponding scene and/or shot number, thus allowing for easier file management later in the editing and/or review process. In a variety of embodiments, the user may be prompted to rename the transferred files via the application running on the mobile computing device 620B.

In further embodiments, the secure media transfer device 610B may generate metadata and integrate the generated metadata into the metadata of the stored media files. By way of example and not limitation, the secure media transfer appliance 610B may utilize the internal cellular and/or GPS signal to generate location metadata to add metadata that correlates to the location of where the data was transferred from an external memory device or when it was uploaded/downloaded to a cloud-based storage service. Other forms of generated metadata may include, but are not limited to, authorized user/owner of the media file, production information, external memory device source information, time of transfer, and speed of transfer.

Additionally, in more embodiments, there may be a desire by the user to set and/or change options relating to deletion of the files which can be administered by the user via the application running on the mobile computing device 620B. A user may wish to delete files quickly from external memory devices in order to reuse them in the field as certain external memory devices may be too expensive to purchase multiple devices. Thus, in certain embodiments, the secure media transfer appliance 610B can be set to delete files automatically from external memory devices once the data has been successfully transferred from the external memory device to the secure media transfer appliance 610B. Likewise, it may be desirable for the user to delete data stored in the secure media transfer appliance 620B in order to keep an available level of unused storage space for as long as possible. Therefore, in these embodiments, the secure media transfer appliance 620B can be configured to automatically delete files stored within its internal memory once a successful transfer of the file to the cloud-based storage system can be verified. In other embodiments, once the secure media transfer appliance 610B has verified a successful transfer of an internally stored file to a cloud-based storage system, the internally stored file may instead be put in a deletion queue that only deletes files as space becomes needed for newer incoming data transfers.

Figure 7A:
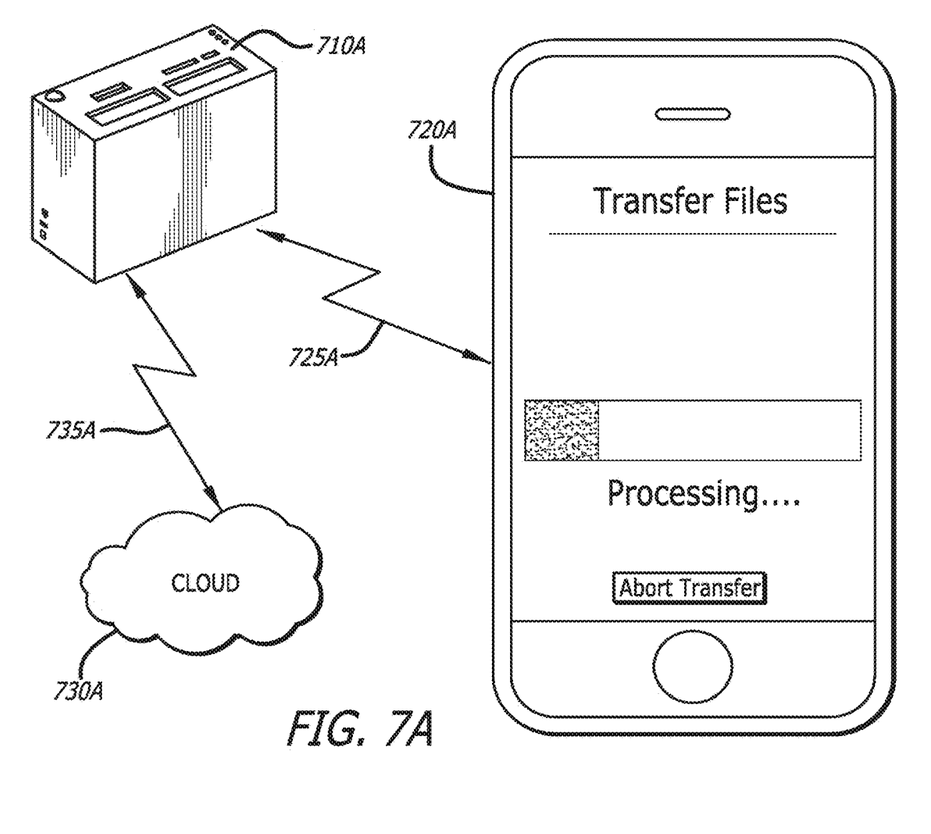
FIG. 7A is an exemplary embodiment of a digital content securely uploading or downloading from a secure media transfer appliance in communication with a portable computing device with a screen into a cloud-based storage service.

Referring to FIG. 7A, an embodiment of a secure media transfer appliance 610A in simultaneous communication via a first wireless connection 715A with a mobile computing device 720A and via a second wireless connection 735A to a cloud-based storage system 730A is shown as a remote secure media transfer system for data transfer 700A. In many embodiments, the secure media transfer appliance 710A is similar to the secure media transfer appliance 110 depicted in FIGS. 1-3 and the mobile computer device 720A is similar to the mobile computing device 115 depicted in FIG. 1.

In a number of embodiments, the transfer of files from the secure media transfer appliance 710A to the cloud-based storage system 730A can be authorized and/or monitored by a user utilizing an application on a mobile computing device 720A that obtains a local wireless connection 725A. As depicted in FIG. 7A, the application may indicate the progress of a file transfer in progress between the secure media transfer appliance 710A and the cloud-based storage service 730A. In further embodiments, the user may be notified that the file transfer successfully occurred in the form including, but not limited to, a text, a push notification, and/or an email message.

In more embodiments, the user may be notified on a variety of events occurring within the secure media transfer appliance including, but not limited to, access of a remote file by another authorized user, successful transfer of an external memory device, successful deletion of files on an external memory device, entering/exiting a lower-power usage mode of operation, low internal battery levels, low internal storage space warnings, and availability of cellular signals for transferring to cloud-based storage systems.

Figure 7B:
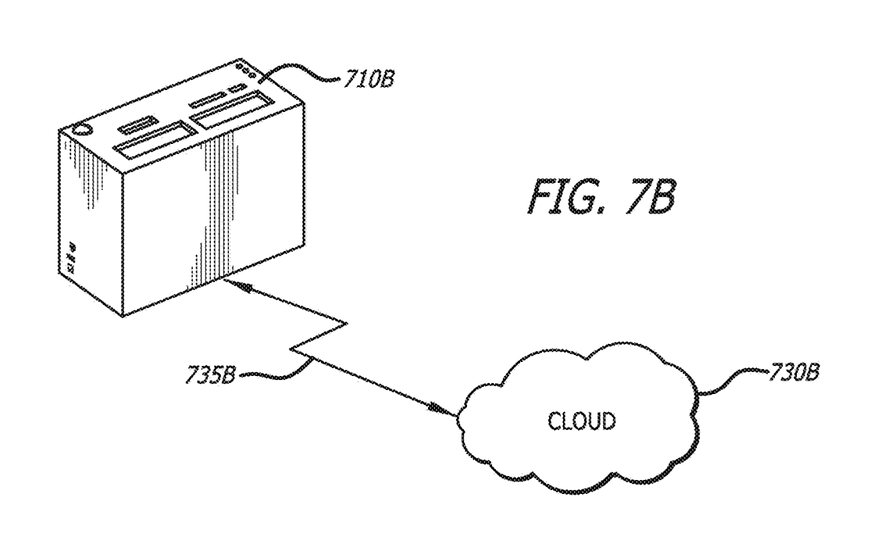
FIG. 7B is an exemplary embodiment of a digital content securely uploading or downloading from a secure media transfer appliance into a cloud-based storage service.

Referring to FIG. 7B, an embodiment of a secure media transfer appliance 710A in communication via a second wireless connection 735B to a cloud-based storage system 730B is shown as an automated remote secure media transfer system for data transfer 700B. In many embodiments, the secure media transfer appliance 710B is similar to the secure media transfer appliance 110 depicted in FIGS. 1-3 and the mobile computer device 720B is similar to the mobile computing device 115 depicted in FIG. 1.

In certain use cases, a user may desire to enter in various settings for the secure media transfer appliance 710B which allow it to function without the need for a local mobile computing device or other corresponding application. Thus, in these embodiments, the secure media transfer appliance 710B can be configured to automatically connect via any available network connection 735B to a predetermined cloud-based storage system 730B and transfer any internally stored files that have not previously been successfully transferred. In this way, an authorized user may configure the secure media transfer appliance 710B initially and then deliver the appliance 710B to other users that are not authorized to access the cloud-based storage account or other settings of the appliance 710B, but who may be authorized to insert external memory devices in order to facilitate transfers. By way of example, and not limitation, a video producer may configure the secure media transfer appliance 710B with various settings and cloud-based storage system 730B credentials prior to a video shoot and then hand the appliance 710B off to a production assistant who may then dump various memory cards as they become filled during the shoot, effecting a transfer and deletion of files from the memory card which can then be used again during the same video shoot.

It can be appreciated by those skilled in the art that the connection between the secure media transfer appliance 710B can and the cloud-based storage service 730B can be accomplished through a variety of means including an internal cellular connection. However, in certain embodiments, the cellular connection can be accomplished through an external cellular connection via an external communication port, or through a local wireless connection to another cellular device including, but not limited to, the mobile computing device depicted as a cellular phone in FIG. 7A.

In the foregoing description, the invention is described with reference to specific exemplary embodiments thereof. It will, however, be evident that various modifications and changes may be made thereto without departing from the broader spirit and scope of the invention as set forth in the appended claims. For instance, the selective system call monitoring may be conducted on system calls generated by logic outside the guest image.

What is claimed is:

1. A data transfer device comprising:
 an enclosure with a plurality of input/output connection ports;
 a processor within the enclosure; and
 a memory within the enclosure, the memory comprising:
 a data store; and a data transfer component, wherein the data transfer component directs the processor to:
- transfer data from an external data source via at least one of the plurality of input/output connection ports, wherein the external data source is external to the data transfer device;
- encrypt the data transferred from the external data source to generate encrypted data;
- store the encrypted data in the data store; and
- responsive to a successful transfer of the data from the external data source and storage of the encrypted data to the data store, automatically delete the data from the external data source.

2. The data transfer device of claim 1, wherein the processor is configured to receive, from an external computing device, one or more instructions for pausing deletion of the data from the external data source until an authorized user has validated the data for deletion.

3. The data transfer device of claim 2, wherein the processor is configured to receive, from the external computing device, one or more instructions for pausing deletion of the encrypted data from the data store until the authorized user has validated the encrypted data for deletion.

4. The data transfer device of claim 2, wherein validation of the data for deletion by the authorized user includes receiving instructions from the external computing device that directs the processor to rename files comprising the data.

5. The data transfer device of claim 2, wherein the data comprises media data, and wherein a validation of the media data for deletion by the authorized user includes receiving instructions from the external computing device that directs the processor to playback the media data prior to deletion.

6. The data transfer device of claim 5, wherein the media data is further processed by at least dynamically adjusting a resolution of the media data for playback in response to either (i) instructions received from the external computing device or (ii) a determined connection speed on the at least one of the plurality of input/output connection ports utilized by the external computing device.

7. The data transfer device of claim 1, wherein the processor is configured to, prior to encrypting the data, establish a connection with an external data storage via a first input/output connection port of the plurality of input/output connection ports.

8. The data transfer device of claim 1, wherein the processor is configured to, prior to encrypting the data, establish a connection with an external data storage via a cellular connection.

9. The data transfer device of claim 1, wherein the enclosure comprises an interface area including one or more hard disk drive slots and one or more memory card slots, and wherein the external data source is communicatively coupled to a first input/output connection port through insertion of the external data source into either a hard disk drive slot of the one or more hard disk drive slots or a memory card slot of the one or more memory card slots.

10. The data transfer device of claim 1, wherein the enclosure is configured to be worn by a user.

11. The data transfer device of claim 1, wherein the memory further comprises a power management component that directs the processor to enter a mode of operation that utilizes less power response to a predetermined amount of time elapsed without any communication occurring on any of the plurality of input/output connection ports.

12. The data transfer device of claim 11, wherein the power management component further directs the processor to enter a mode of operation that utilizes less power responsive to a loss of a cellular connection at one of the plurality of input/output connection ports.

13. A computer-implemented method comprising:
under control of a data transfer device comprising a processor, a data store, and an input/output connection port:
- transferring data from an external data source via the input/output connection port, wherein the external data source is external to the data transfer device;
- encrypting the data transferred from the external data source to generate encrypted data;
- storing the encrypted data in the data store; and
- responsive to a successful transfer of the data from the external data source and storage of the encrypted data to the data store, automatically deleting the data from the external data source.

14. The computer-implemented method of claim 13, further comprising receiving, from an external computing device, one or more instructions for pausing deletion of the data from the external data source until an authorized user has validated the data for deletion.

15. The computer-implemented method of claim 14, further comprising receiving, from the external computing device, one or more instructions for pausing deletion of the encrypted data from the data store until the authorized user has validated the encrypted data for deletion.

16. The computer-implemented method of claim 14, wherein validation of the data for deletion by the authorized user includes receiving instructions from the external computing device that directs the processor to rename files comprising the data.

17. The computer-implemented method of claim 14, wherein the data comprises media data, and wherein a validation of the media data for deletion by the authorized user includes receiving instructions from the external computing device that directs the processor to playback the media data prior to deletion.

18. The computer-implemented method of claim 17, further comprising dynamically adjusting a resolution of the media data for playback in response to either (i) instructions received from the external computing device or (ii) a determined connection speed on the input/output connection port.

19. The computer-implemented method of claim 13, further comprising entering a mode of operation that utilizes less power response to a predetermined amount of time elapsed without any communication occurring on the input/output connection port.

20. The computer-implemented method of claim 19, further comprising entering a mode of operation that utilizes less power responsive to a loss of a cellular connection.

* * * * *